US010298510B1

(12) United States Patent
Parthasarathy et al.

(10) Patent No.: US 10,298,510 B1
(45) Date of Patent: May 21, 2019

(54) CONTROLLING DATA TRANSMISSION RATES OF MULTIPLE DEVICES

(71) Applicant: Amazon Technologies, Inc., Seattle, WA (US)

(72) Inventors: Yadunandan Parthasarathy, Bellevue, WA (US); Calvin Yue-Ren Kuo, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 14/971,411

(22) Filed: Dec. 16, 2015

(51) Int. Cl.
*H04L 12/877* (2013.01)
*H04L 12/911* (2013.01)
*H04L 12/835* (2013.01)
*H04L 12/823* (2013.01)
*H04L 12/825* (2013.01)
*H04L 12/815* (2013.01)
*H04W 28/02* (2009.01)
*H04W 28/22* (2009.01)
(Continued)

(52) U.S. Cl.
CPC ........ *H04L 47/525* (2013.01); *H04L 43/0894* (2013.01); *H04L 47/10* (2013.01); *H04L 47/125* (2013.01); *H04L 47/22* (2013.01); *H04L 47/225* (2013.01); *H04L 47/25* (2013.01); *H04L 47/30* (2013.01); *H04L 47/32* (2013.01); *H04L 47/41* (2013.01); *H04L 47/823* (2013.01); *H04L 47/827* (2013.01); *H04L 47/828* (2013.01); *H04W 28/0289* (2013.01); *H04W 28/22* (2013.01)

(58) Field of Classification Search
CPC ... H04L 47/225; H04L 47/828; H04L 47/827; H04L 47/32; H04L 47/30; H04L 47/25; H04L 47/22; H04L 47/41; H04L 47/823; H04L 47/125; H04L 43/0894; H04L 47/10; H04L 47/525; H04W 28/22; H04W 28/0289
See application file for complete search history.

(56) References Cited

U.S. PATENT DOCUMENTS 7,349,337 B1 * 3/2008 Mahdavi ............... H04L 47/193
370/230.1
8,848,526 B1 * 9/2014 Channabasappa ..........................
H04L 12/6418
370/230.1

(Continued)

*Primary Examiner* — Kwang B Yao
*Assistant Examiner* — Moo Jeong
(74) *Attorney, Agent, or Firm* — Lee & Hayes, P.C.; Charles L. Warner

(57) ABSTRACT

The data transmission rate (DTR) of a data devices (12) connected to a data transmission service is controlled to be within an authorized collective DTR for the data devices, such as the authorized total DTR for a customer. The data devices transfer data to and/or from a data storage system (20) through front end hosts (16). The front end hosts send messages to a controller (22A) reporting the amount of data transferred and the data devices responsible for the data transfer. The controller determines whether the data devices are exceeding the authorized collective DTR and, if so, directs the front end hosts to increase the latency or delay before a front end host acknowledges receipt of data from the data devices and/or to decrease the buffer size in the front end host with respect to those data devices. This brings the DTR within the authorized collective DTR.

16 Claims, 10 Drawing Sheets

(51) Int. Cl.
    *H04L 12/891*     (2013.01)
    *H04L 12/803*     (2013.01)
    *H04L 12/801*     (2013.01)
    *H04L 12/26*     (2006.01)

(56) References Cited

U.S. PATENT DOCUMENTS

| | | | | |
|---|---|---|---|---|
| 2006/0030323 | A1* | 2/2006 | Ode | H04W 36/30 |
| | | | | 455/436 |
| 2006/0166677 | A1* | 7/2006 | Derakshan | H04W 36/14 |
| | | | | 455/453 |
| 2009/0310487 | A1* | 12/2009 | Eriksson | H04L 47/10 |
| | | | | 370/235 |
| 2011/0228686 | A1* | 9/2011 | Hyoudou | H04L 12/44 |
| | | | | 370/252 |
| 2012/0051216 | A1* | 3/2012 | Zhang | H04L 47/12 |
| | | | | 370/230 |
| 2015/0139004 | A1* | 5/2015 | Fodor | H04W 72/082 |
| | | | | 370/252 |
| 2016/0143040 | A1* | 5/2016 | Rivard | H04W 24/08 |
| | | | | 370/329 |
| 2016/0315841 | A1* | 10/2016 | Kang | H04L 43/0864 |

\* cited by examiner

CONTROLLING DATA TRANSMISSION RATES OF MULTIPLE DEVICES

BACKGROUND

An entity needing data transfers from numerous devices can become a customer of a data transmission (and storage) service and contract with the service to provide a specified data transmission rate for the customer's devices. If a device or devices of the customer send too much data too quickly the customer can be charged for the excess data transmission rate, or service to some of the customer's devices can be interrupted, generally without the customer having advance notice of the problem or being able to control which devices have interrupted service.

Selectively disconnecting devices when the authorized data transmission rate is exceeded is not desirable because of the network overhead typically involved with reconnecting a device. Further, instructing a device to change its data transmission rate is generally not possible because most devices do not have that capability. In addition, communicating instructions to the devices can be difficult because different devices often have different protocols. This can result in the customer buying a higher data transmission rate than normally needed just to prevent devices from being dropped from the network when the authorized data transmission rate is exceeded, or the customer taking a chance that an important device will not lose service at a critical time.

This can be expected to become a greater and greater problem in the future as the "Internet of Things" gains more usage, and more and more devices are connected to the Internet. The "Internet of Things" is a term generally referring to a myriad of different devices and types of devices being connected or interconnected via the Internet. The devices can range from having limited available resources (memory size, processor speed, etc.) and needing small or infrequent data transmissions to having substantial available resources and needing large and/or frequent data transmissions.

DETAILED DESCRIPTION

Figure 1:
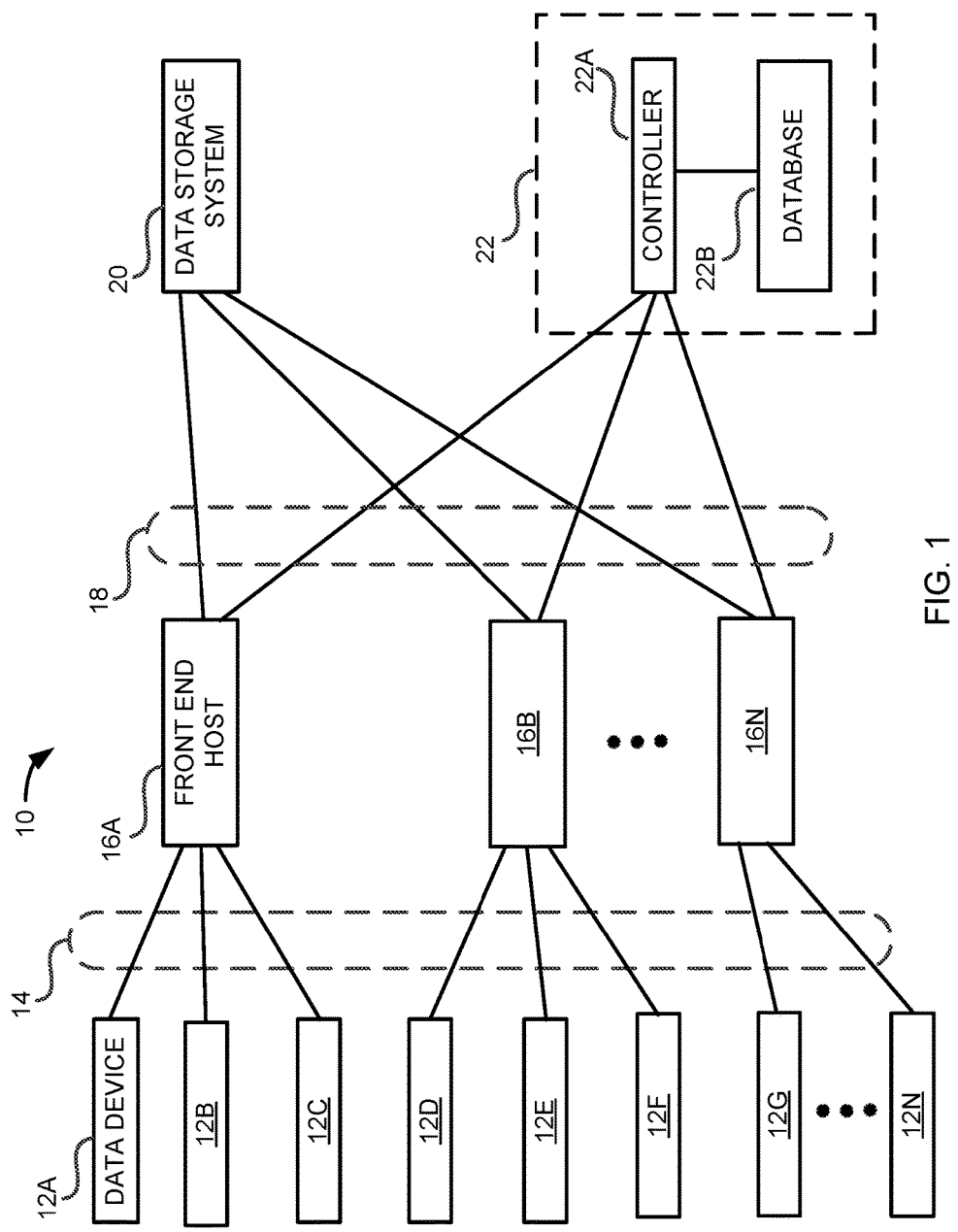
FIG. 1 is an illustration of an exemplary data transmission rate (DTR) control system.

The following detailed description is directed to technologies for controlling the data transmission rate (DTR) of devices, such as but not limited to Internet of Things (IoT) devices. Controlling the DTR of a device and groups of devices protects against a customer unexpectedly receiving a large invoice for data transmission services from the service provider, and prevents a properly functioning device or a malfunctioning device from impeding data transfers from other devices by using all or substantially all of the bandwidth of communications links. Controlling the DTR also protects against a rogue or security-compromised device using all or substantially all of the bandwidth of the communications links.

The technologies discussed herein permit a customer to specify a data transfer rate for a particular device or for all the devices, collectively, of that customer. Controlling the DTR as described herein also avoids issues with multiple different device protocols. Controlling the DTR avoids having to disconnect any device due to excessive data transmissions; this avoids having to initiate new connections, which are often costly in terms of time and resources (messaging bandwidth) when initiating new connections. Controlling the DTR also allows for dynamic adjustment of the data transfer rates of each device so as to provide higher data transfer rates, when needed, while not exceeding the total data transfer rate for all of the devices of a customer. The DTR is controlled by adjusting the delay or latency in responding to data transfers from the customer's device and/or by adjusting the buffer size used to receive data transfers from the customer's device.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is an illustration of the environment of the exemplary data rate control system 10. Consider first a conventional data transmission service offered to customers by a company. The customers will have a plurality of data devices 12A-12N connected via a network 14 to a plurality of front end hosts 16A-16N, which are connected by another network 18, which is typically an internal network but which might include the Internet, to a data storage system 20 (also known as a "datastore"). The data devices 12A-12N might be referred to herein in the singular or generally as a device 12, or in the plural or generally as devices 12, depending upon the context of the sentence. Further, although the devices 12 may be referred to herein as "customer devices", that is for convenience of discussion, is merely one exemplary application of the devices 12, and should not be considered as limiting the scope of the devices 12. For example, the devices 12 can be devices used by the data transmission service itself. The network 14 can be, but not limited to, the Internet.

The front end hosts 16A-16N might be referred to herein in the singular or generally as a front end host (FEH) 16, or in the plural or generally as front end hosts 16, depending upon the context of the sentence. Each front end host 16 services multiple devices 12. For example, a front end host 16 can service 10,000 devices 12, 100,000 devices 12, or some other convenient and desirable number of devices 12. For simplicity of illustration and discussion, FEH 16A is illustrated as servicing devices 12A-12C, FEH 16B is illustrated as servicing devices 12D-12F, and FEH 16N is illustrated as servicing devices 12G-12N. The network 18 is typically an internal network but can also include the Internet or other networks. Networks 14 and 18 can be completely independent, can be the same, or might partially overlap. The data storage system 20 can be a plurality of data storage servers.

Consider now the operation with the components 12, 14, 16, 18 and 20 mentioned above. A device 12 having data to be stored will send that data via the network 14 to a front end host 16, which will then forward the data to the data storage system 20, which stores the data. Similarly, a device 12 might need data so it will send a message to the data storage system 20 requesting that data, and the data storage system 20 will retrieve the data and send it to an FEH 16, which then forwards the data to the requesting device 12. The devices 12 can communicate with the FEH 16 using any desired protocol.

The DTR is related to, but is different than, the data transmission speed. The data transmission speed refers to the speed at which a network 14 can move data across the network in a unit of time, for example, 10 GB/s. The DTR refers to the amount of data that is actually transferred in a unit of time, for example, 1 GB/s. Typically, a customer (client) contracts with a data storage service to provide a certain DTR (e.g., megabytes/second (MB/s) or gigabytes/second (GB/s)), also known as a transmission capacity, for all of the customer's devices 12, e.g., a "collective" DTR. For example, assume that the DTR purchased by the customer is 1 GB/s. Thus, even though the network 14 can handle 10 GB/s, the customer's devices are only allowed to use 10% of that rate, meaning that the customer's devices can transmit at the network data transmission speed, but might only transmit 10% of the time so that the actual DTR is the purchased 1 GB/s. Although the DTR is referred to herein as being the DTR of a customer or the customer's devices, that is merely for convenience of discussion, and should not be considered as limiting the scope of the DTR. For example, the DTR can be imposed by the data transmission service on its own data devices 12, a set of devices 12 dedicated to a particular function, a set of devices 12 using a particular network, etc.

As long as the total DTR for the customer's devices 12 does not exceed the agreed-upon DTR the customer should not be surprised by a larger-than-expected bill from the data storage service. Consider, however, the situations where one or more devices 12 send proper, but unusually large amounts of data, or where one or more devices 12 malfunctions, such as due to a corrupted operating instruction, and suddenly begin sending large amounts of data. If the DTR is not controlled, the devices can individually or collectively send more data per unit of time than the customer has contracted for. For example, the customer has contracted for a DTR of 1 GB/s, and one or more of the customer's devices sends 20 GB of data at the network data transmission speed (10 GB/s), the customer will have exceeded the agreed upon DTR and can then be subjected to a larger-than-expected invoice for the higher data transmission services.

Now consider the addition of an exemplary DTR control system 22. The DTR control system 22 has a controller 22A which is connected to a database 22B. The database 22B can be dedicated to the controller 22A or can be, for example, included in the data storage system 20 or in another data storage system or device. The FEH 16 are connected to the controller 22A, such as by the network 18. Whenever an FEH 16 transfers data to or from a device 12, the FEH 16 also sends a message to the data rate control system 22 advising of the identification (e.g., the name, number, MAC address, etc., or other identifier) of the device 12 and of the size of the data transferred (e.g., MB or GB). This message can therefore be considered to be a "metadata" message. The database 22B preferably contains information about the various customers, such as the DTR purchased by each customer, the name or other identifier of each device 12, and the customer with which a device 12 is associated.

One approach is for the DTR control system 22 to simply to apportion the customer's DTR among the FEHs 16 based upon how many of the customer's devices 12 that each FEH 16 is servicing. Each FEH 16 would simply report to the controller 22A an identification of the devices 12 it is servicing or the number of devices 12 it is servicing for each customer that it is servicing. For example, if a customer's DTR is 1 GB/s, FEH 16A reports that it is servicing five devices 12 for that customer, and FEH 16B reports that it is servicing fifteen devices 12 for that customer, then the 1 GB/s DTR will be divided among the twenty devices 12 of that customer, so each device 12 will have an authorized DTR of 50 MB/s (1 GB/s divided among 20 devices). FEH 16A is servicing five devices 12 so it would be authorized to use 250 MB/s of the DTR for that customer, and FEH 16B is servicing fifteen devices so it would be authorized to use 750 MB/s of the DTR for that customer. Each FEH 16 would then divide its authorized DTR among the devices 12 it is servicing so that each device 12 would have an authorized DTR of 50 MB/s.

This approach, while simple and straightforward, suffers in that the allocation of the customer's DTR among the FEHs 16A and 16B might not reflect the actual needs of the devices 12. For example, assume that one of the devices 12 connected to FEH 16A has a large amount of data to send, which would exceed the authorized DTR of 50 MB/s for that device 12, so the DTR with respect to that device 12 will have to be throttled so as not to exceed its authorized DTR of 50 MB/s. Also assume that the four other devices 12 connected to FEH 16A and the fifteen devices 12 connected to FEH 16B have very little data to send, so their DTR allocation is almost unused. This results in the customer having paid for a DTR of 1 GB/s, but only receiving a DTR of 50 MB/s (the one device 12 on FEH 16A which has data to send).

Another approach is to allocate and control the DTR for each device 12. Assume that device 12A has a large amount of data to send. The associated FEH 16A sends a message to the controller 22A advising of the identification of the device 12 and the size of the data being transferred, etc. The controller 22A can use the identification of the device 12 to determine the customer associated with that device, the authorized DTR for that customer, and/or the customer-authorized DTR for that particular device 12. The controller 22A can consider the transmissions of the other devices 12 of that customer. If the controller 22A determines that the authorized DTR of the customer will be or is being exceeded, or that the customer-authorized DTR of that device 12 will be or is being exceeded, then the controller 22A will send an instruction to the FEH 16A to slow or "throttle back" on the transmissions to/from the device 12A.

A device 12A sends one or more packets of data, and then waits for an acknowledgement that the packet(s) has been received. Once the acknowledgement has been received then the device 12A sends another packet or set of packets, waits for another acknowledgement, and so on. The transmission rate from the device 12A can therefore be controlled by applying back pressure, that is, by increasing the "latency" of the transmission. This can be accomplished by delaying sending an acknowledgement to the device 12A. For example, if the authorized DTR for that customer is 1 GB/s, the packet size is 1 MB, and the data transmission speed of the network 14 is 10 GB/s, then the FEH 16A can simply delay sending the acknowledgement by approximately 1 millisecond, rather than sending the acknowledgement immediately. A delay of 1 millisecond means that only 1000 packets can be sent in a second, regardless of the data transmission speed, so the device 12A will have a DTR of 1 GB/s (1000 packets/second×1 MB/packet). Thus, the DTR can be controlled without changing the data transmission speed or in addition to changing the data transmission speed.

The transmission rate can further be controlled by adjusting the receive buffer size in the FEH 16A so that device 12A can only send a smaller amount of data without having to wait for an acknowledgement before it can resume sending data. For example, the buffer size in the FEH 16A for that particular device 12A can be reduced, thereby requiring the device 12A to wait more often before it can resume transmission. As an example, if the buffer size in the FEH 16A for that device 12A is LOMB (10 packets) then it can be reduced to 5 MB (5 packets). Thus, the device 12A would only be able to send half as much data per transmission before having to wait for the FEH 16A to authorize the device 12A to send more data. The delay, or latency, can be of any desired size but is preferably not so large that the device 12A retransmits the data or determines that it has been disconnected and then attempt a re-connect procedure.

If the data transmission speed on a network is adjustable, the DTR may be further controlled by adjusting the data transmission speed on the network in addition to adjusting the latency and/or buffer size. Thus, the DTR is changed by adjusting the latency and/or the buffer size, and, optionally, by adjusting the data transmission speed. In the configurations discussed herein, however, the DTR is not changed by adjusting only the data transmission speed.

Control of the transmission rate can also be applied to data being sent to the device 16 if the FEH 16A has sufficient memory capacity on its own to store an amount of data corresponding the transmission rate. If the controller 22A determines that the allowable transmission rate is being exceeded or will be exceeded then the controller 22A will send an instruction to the FEH 16A to slow or "throttle back" on the transmission rate to the device 12A. The FEH 16A stores data received from the data storage system 20 and then simply inserts a delay between the packets sent to the device 12A, even if the device 12A immediately acknowledges receipt of the packets. The FEH 16A therefore sends data in amounts, and with a frequency, that will observe the maximum allowable data rate for that customer or that device 12A.

In addition, or alternatively, this can be done by throttling back in a manner similar to that discussed above but, instead, the throttling back is done with respect to the data storage system 20. That is, the delays in acknowledgement and/or the adjustment in the buffer size are used with respect to data from the data storage system 20. For example, the data storage system 20 sends data to the FEH 16A for transmission to the device 12A, and then waits for an acknowledgement from the FEH 16A that the data has been received. The FEH 16A can forward the packet or packets to the device 12A as they are received from the data storage system 20 but delays acknowledging receipt to the data storage system 20. Once the acknowledgement has been received by the data storage system 20 then it sends another packet or set of packets, waits for another acknowledgement, and so on.

The data transmission speed between each FEH 16 and the controller 22A, or the speed at which the controller 22A can ingest data from the FEHs 16, can become a limiting factor. For example, assume that each message from an FEH 16 to the controller 22A is 100 B, each FEH 16 has 100,000 devices connected to it via the network 14, and an FEH 16 can send/receive 1000 messages/second from each device 12. This results in a data transmission rate of 10 GB/s (100 B/message×1000 messages/second/device×100,000 devices) between each FEH device 16 and the controller 22A, and also means that the controller 22A must be able to process 10 GB/s of data from each FEH 16.

To avoid this limitation an FEH 16 can aggregate the information before sending it to the controller 22A. An FEH 16 can have its own database regarding the authorized DTR of various customers and various devices 12. When an FEH 16 receives data from a device 12 it checks the database to determine with which customer the device 12 is associated. The FEH 16 aggregates data for each customer which has a device 12 transmitting data. The FEH 16 sends to the controller 22A a message containing an identification of the customer, the devices 12, and the total amount of data being sent by all the devices 12 which the FEH 16 is servicing for a customer. This can be done at the same rate at which the FEH 16 would send individual messages, e.g., 1000 messages/second, or can be done on a less frequent basis, e.g., 100 messages/second, 10 messages/second, etc.

The FEH 16 can also include a list of the devices 12 in the messages. The controller 22A then uses this information from the various FEHs 16 to determine whether the authorized DTR for any customer is being exceeded. If so then the controller 22A will consider the priority rating of the various customers and the priority ratings of the various devices of each customer, determine a new authorized DTR for each device 12, and send that new authorized DTR to the FEHs 16.

Another approach is for the controller 22A to apportion the authorized DTR for each customer among the FEHs 16 which are servicing devices 12 for each customer based upon, for example, the number of devices 12 of a customer that are being serviced by an FEH 16 and/or minimum DTRs specified by the customer for its various devices 12. The controller 22A sends each FEH 16 an indication of the authorized DTR for that FEH 16 for each customer being serviced by that FEH 16. The FEH 16 then uses the information in its database regarding the authorized DTR for each customer to apportion that authorized DTR among the various devices 12 that are being serviced by that FEH 16. For example, a customer can have an authorized DTR of 1 GB/s, with the devices 12 of that customer being serviced by FEHs 16A and 16B.

The controller 22A advises FEH 16A that the authorized DTR for that customer with respect to FEH 16A is 750 MB/s, and advise FEH 16B that the authorized DTR for that customer with respect to FEH 16B is 250 MB/s. The FEH 16A will consider the priority rating of each device 12 that it is servicing for that customer and then apportion that 750 MB/s data rate among those devices 12 accordingly, rather than just dividing the transmission data rate evenly among its devices 12.

Similarly, the FEH 16B will consider the priority rating of each device 12 that it is servicing for that customer and then apportion that 250 MB/s data rate among those devices 12. Thus, the controller 22A determines how much of the customer's authorized DTR each FEH 16 can use, and the FEHs 16 determine how that DTR should be allocated among the devices 12 that it services for that customer. This relieves the controller 22A of the burden of having to determine an authorized DTR for each device 12.

The controller 22A, however, is still handling and making decisions regarding allocation of the authorized DTR among the FEHs 16 for each of the customers. Further, aggregating the requests by the FEHs 16, and shifting the determination of the allocation of the customer's authorized DTR among the various devices 12 from the controller 22A to the FEHs 16 can overburden the FEHs 16. To avoid this, aggregators can be used instead of a single controller 22A.

Figure 2:
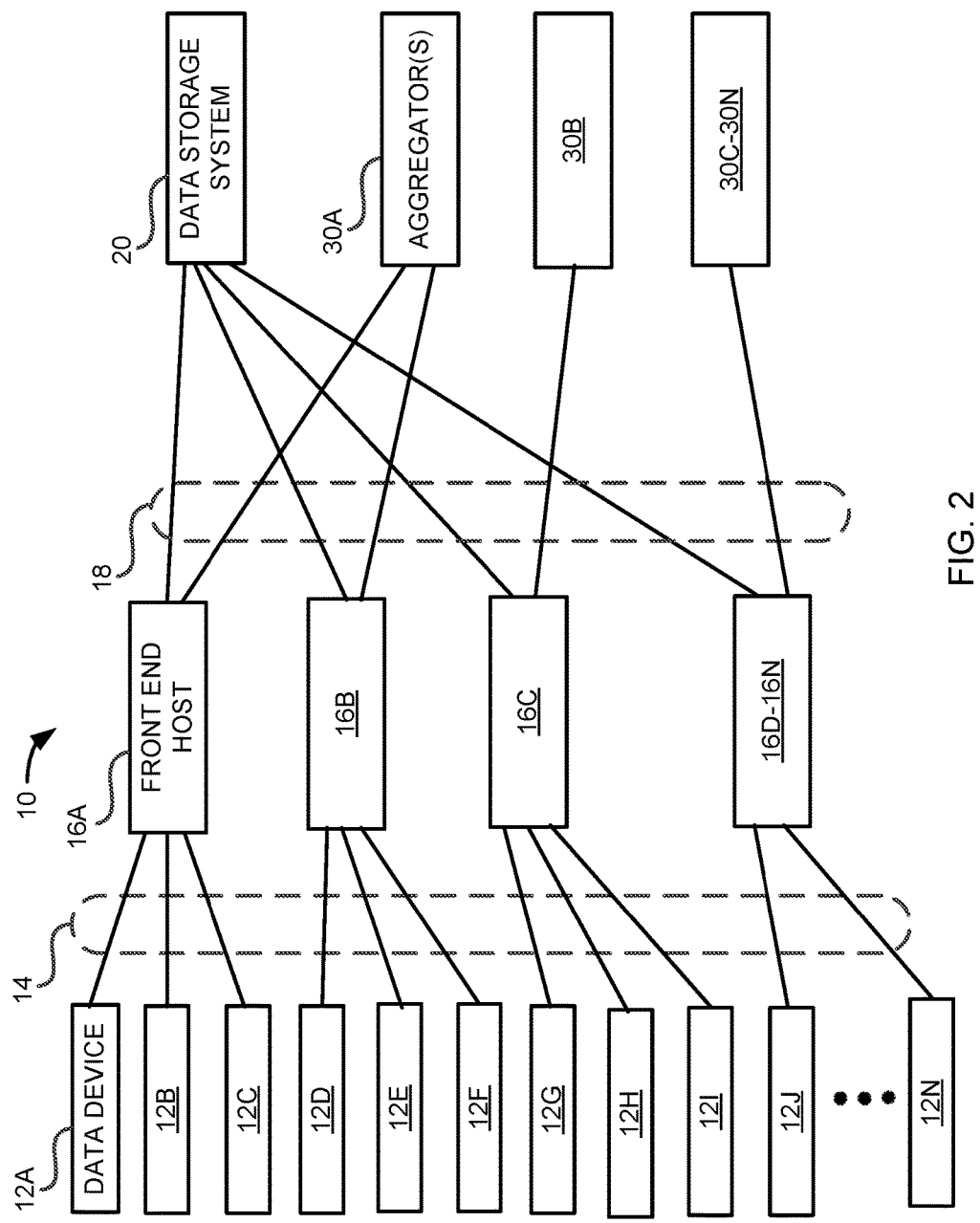
FIG. 2 is an illustration of an exemplary DTR control system with aggregators.

FIG. 2 is an illustration of an exemplary data rate control system with aggregators 30. In this implementation, each FEH 16 services the devices 12 for a particular customer. For example, devices 12A-12C are the devices of customer #1, and are serviced by FEH 16A, devices 12D-12F are also the devices of customer #1, and are serviced by FEH 16B, devices 12G-12I are the devices of customer #2, and are serviced by FEH 16C, and devices 12J-12N are serviced by respective FEH 16D-16N for other respective customers. FEHs 16A and 16B report to aggregator 30A for the servicing of customer #1, FEH 16C reports to aggregator 30B for the servicing of customer #1, and FEH 16D-16N report to respective aggregators 30C-30N for other respective customers. Thus, there are a plurality of aggregators 30, with each aggregator 30 servicing the FEHs 16 and devices 12 of a respective customer. Some aggregators 30 can also service one or more FEHs 16 servicing devices 12 of customers having smaller needs. The aggregators 30 might be referred to herein in the singular or generally as an aggregator 30, or in the plural or generally as aggregators 30, depending upon the context of the sentence.

FEHs 16A and 16B send messages, to aggregator 30A, which advise of the identification of the devices 12 and the size of the data transfers, etc. The aggregator 30A has a database (such as database 22B with respect to controller 22A), or can access a database (such as may be in data storage system 20), which contains information on the authorized DTR for the particular customer serviced by FEH 16A and 16B and aggregator 30A, and the customer-specified minimum and/or maximum DTRs of that customer's devices 12.

If the aggregator 30A determines that authorized DTR for that particular customer will be exceeded, or is being exceeded, then the aggregator 30A will send instructions to the FEH 16A and/or 16B as to how much of the authorized DTR is allocated to FEH 16A and how much is allocated to FEH 16B. The FEHs 16A and 16B allocate their respective portions of the authorized DTR among their various devices 12A-12C and 12D-12F, respectively. The FEHs 16A and 16B can base the allocation upon the current data transfer from their respective devices 12 and/or the minimum and/or maximum authorized DTRs for those particular devices 12.

Information about the minimum and/or maximum authorized DTRs for particular devices can be stored in a memory in the FEHs 16, or might be obtained from the data storage system 20. With this information regarding allocation of the authorized DTR among their various devices the FEHs 16 can throttle back the transmissions with respect to those devices 12, as described above. Alternatively, the aggregator 30A can make the DTR determination for each of the devices 12A-12F and send that DTR information to the FEHs 16A and 16B, which then implement the throttling back for their respective devices according to that DTR information.

If a customer has many devices 12, and many assigned FEHs 16, then a single aggregator can have difficulty reallocating the authorized DTR among the various FEH and/or devices 12 in a timely manner. To resolve an aggregator 30 can comprise an aggregator group of sub-aggregators.

Figure 3:
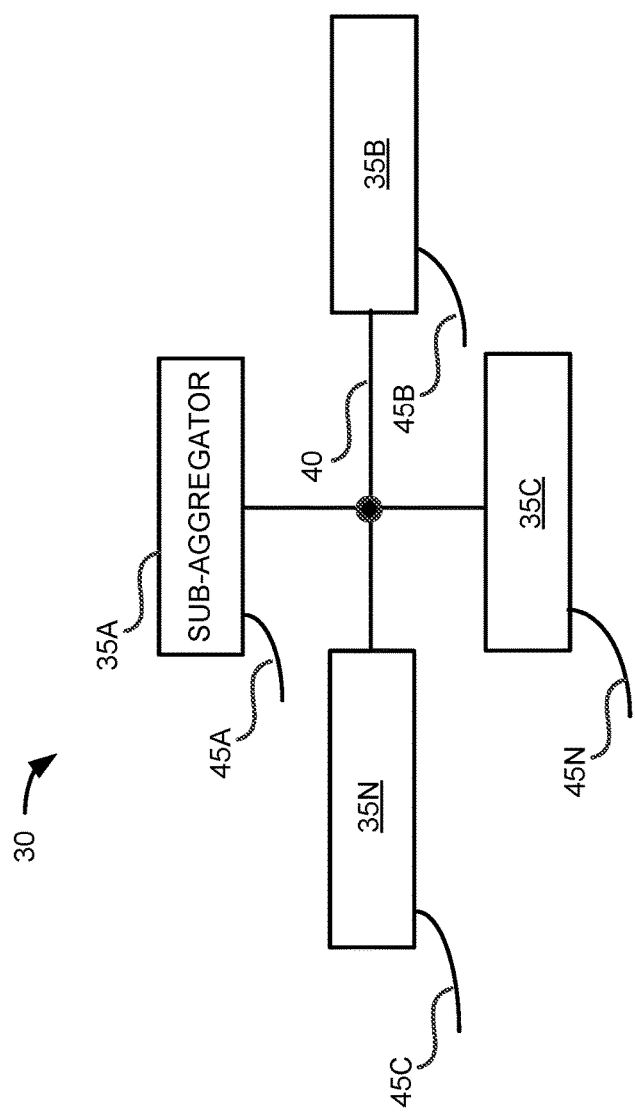
FIG. 3 is an illustration of an aggregator group containing multiple sub-aggregators.

FIG. 3 is an illustration of an aggregator group 30 containing multiple sub-aggregators 35A-35N, linked together by a network 40, which can be the same as or include portions of networks 14 and 18. The sub-aggregators 35A-35N might be referred to herein in the singular or generally as a sub-aggregator 35, or in the plural or generally as sub-aggregators 35, depending upon the context of the sentence. Each sub-aggregator 35 is connected to one or more respective assigned FEHs 16, as indicated by the lines 45A-45N. For example, sub-aggregator 35A can be assigned to FEH 16A, sub-aggregator 35B can be assigned to FEH 16B, etc. The sub-aggregators 35 preferably, but not necessarily, share a common database, such as database 22B, or can access the data storage system 20, to obtain information on the authorized DTR for the particular customer serviced by sub-aggregators 35, and the minimum and/or maximum authorized DTRs of that customer's devices 12.

In one implementation the sub-aggregators 35 in an aggregator group 30 can elect one of the sub-aggregators 35 to be the primary sub-aggregator 35, and the primary sub-aggregator makes the determinations and allocates the authorized DTR for the particular customer among the other sub-aggregators 35. Preferably, but not necessarily, the least busy sub-aggregator in the aggregator group 30 would be elected for this job.

In another implementation, each sub-aggregator 35 shares (sends) its information with the other sub-aggregators 35 in its aggregator group 30. Thus, each sub-aggregator 35 has full information about the DTR needs of all of the FEHs 16 and devices 12 associated with that customer and can make determinations as to its own DTR and the DTRs of its respective FEHs 16 and devices 12. As each group of FEH 16 and sub-aggregators 35 can be dedicated to a particular customer, an FEH 16 for one customer can be overloaded even while FEHs 16 for other customers have unused DTR capacity.

Figure 4:
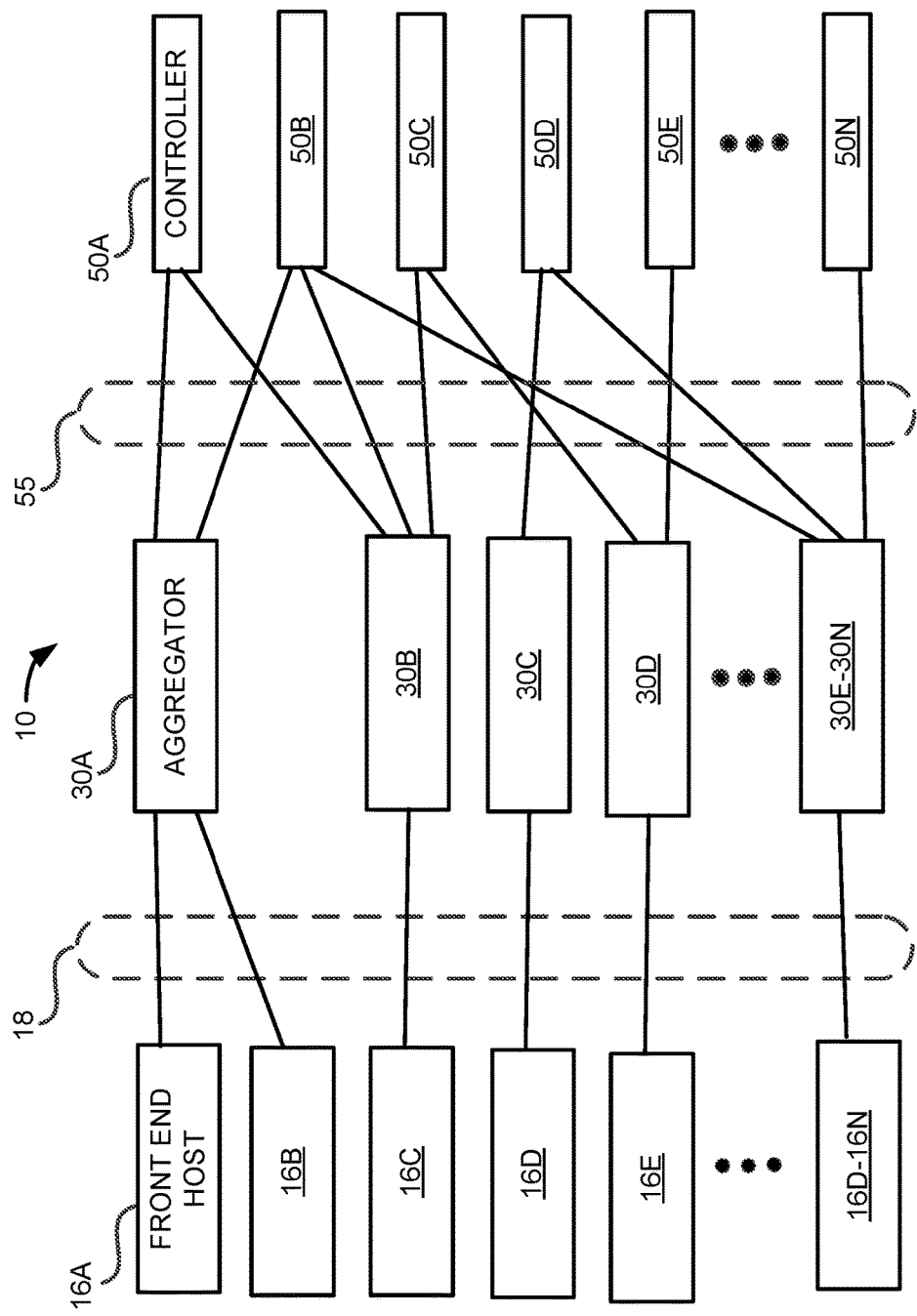
FIG. 4 is an illustration of an exemplary DTR control system with aggregators and data rate controllers.

FIG. 4 is an illustration of an exemplary data rate control system 10 with aggregators 30 and DTR controllers 50. For convenience of illustration, the devices 12 and the data storage system 20 are not shown. In this implementation, each FEH 16 services the devices 12 for one or more customers. Each FEH 16 then sends information regarding the devices 12 and the data transfers to an aggregator 30, which aggregates information by customer. The aggregator 30 then sends the aggregated information over a network 55 to one or more controllers 50 which are responsible for a particular customer or customers.

The network 55 can be an independent network or can include networks 14 and/or 18. The controllers 50 might be referred to herein in the singular or generally as a controller 50, or in the plural or generally as controllers 50, depending upon the context of the sentence. As illustrated, aggregator 30A is connected to FEH 16A and 16B, and sends information regarding one customer to controller 50A, and information regarding another customer to controller 50B. Aggregator 30B is connected to FEH 16C, and sends information regarding one customer to controller 50A, information regarding another customer to controller 50B, and information regarding yet another customer to controller 50C. Similarly, aggregator 30C sends information regarding one customer to controller 50C, aggregator 30D sends information regarding one customer to controller 50C and information regarding another customer to controller 50D, and aggregators 30E-30N send information regarding their respective customers to controllers 50E-50N, as appropriate for the number and size of the customers.

A controller 50 is preferably programmed to obtain all of the information for its assigned customers. A controller 50 thus further aggregates the information for a customer even if that information is spread over multiple aggregators 30 and multiple FEHs 16. Controller 50A has information regarding the DTR needs on FEH 16A, 16B, and 16C, controller 50B has information regarding the DTR needs on FEH 16A, 16B, and 16N, controller 50C has information regarding the DTR needs on FEH 16C and 16E, etc.

Each controller 50 is dedicated to the servicing of a particular customer and sends DTR control information to its respective aggregator(s) 30, which in turn sends particular DTR control information to its respective FEH 16. An aggregator 30 can also send aggregate information regarding other customers or regarding its respective FEH 16 to its controller(s) 50 for consideration so that an FEH 16 is not inadvertently overloaded. The number of customers being serviced by each controller 50 might not be the same for all controllers 50. For example, multiple customers with small data rate requirements can be serviced by a single controller 50.

Figure 5:
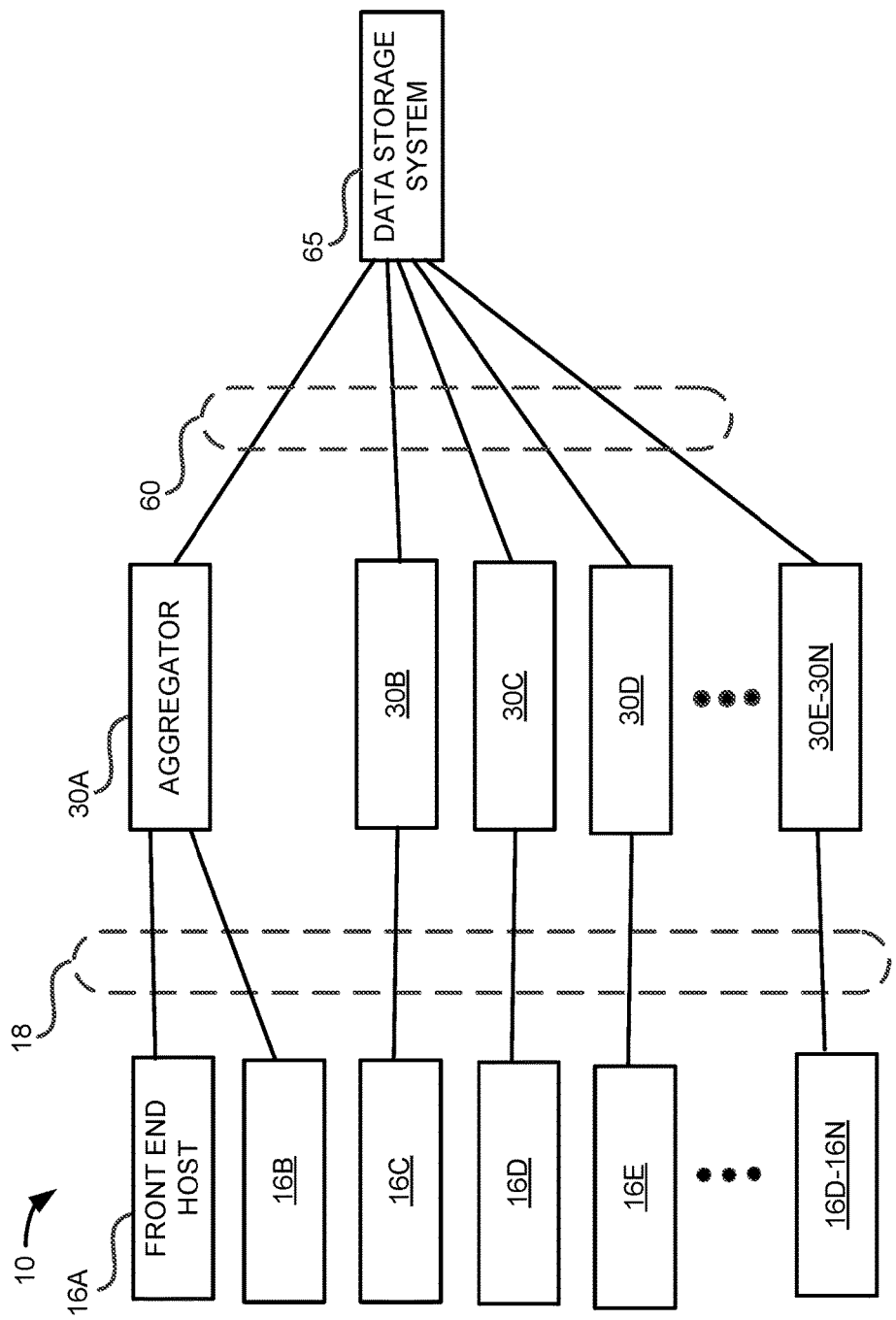
FIG. 5 is an illustration of an exemplary DTR control system with aggregators using a common data storage system.

FIG. 5 is an illustration of an exemplary DTR control system with aggregators 30 using a common data storage system 65. In this implementation, rather than the aggregators 30 sending the information to the controllers 50 and waiting for a response, the aggregators 30 send their information to a data storage system 65, which might be the same or different than data storage system 20, and the data storage system 65 stores the information and aggregates the information from all the aggregators 30 by customer.

The aggregators 30 are connected to the data storage system 65 via a network 60, which can be an independent network or which can include parts or all of the networks 14 and/or 18. Each aggregator 30 retrieves the aggregated information from the data storage system 65, preferably for all customers (the "global" information), and at least for its own customers, and makes a determination as to how the authorized DTR for its customer(s) is to be allocated among the FEH 16 and/or the devices 12. If the information for N devices 12 is reported by one or more FEH 16 to the aggregator 30A then the aggregator 30A is responsible for obtaining the global or customer-specific information from the data storage system 20, determine the new authorized DTRs and/or throttling rates for its N devices 12, and communicate that information to the appropriate FEHs 16 servicing those N devices 12.

The data storage systems 20 and 65 can be in one or more locations, are preferably backed up or have duplicates, preferably are powered via an uninterruptible power supply, require username and password and other login information, restrict data access to authorized or verified devices or processes, can use encryption, can use erasure encoding or other data recovery techniques, etc., all in accordance with good practices regarding the preservation and safekeeping of data.

Figure 6:
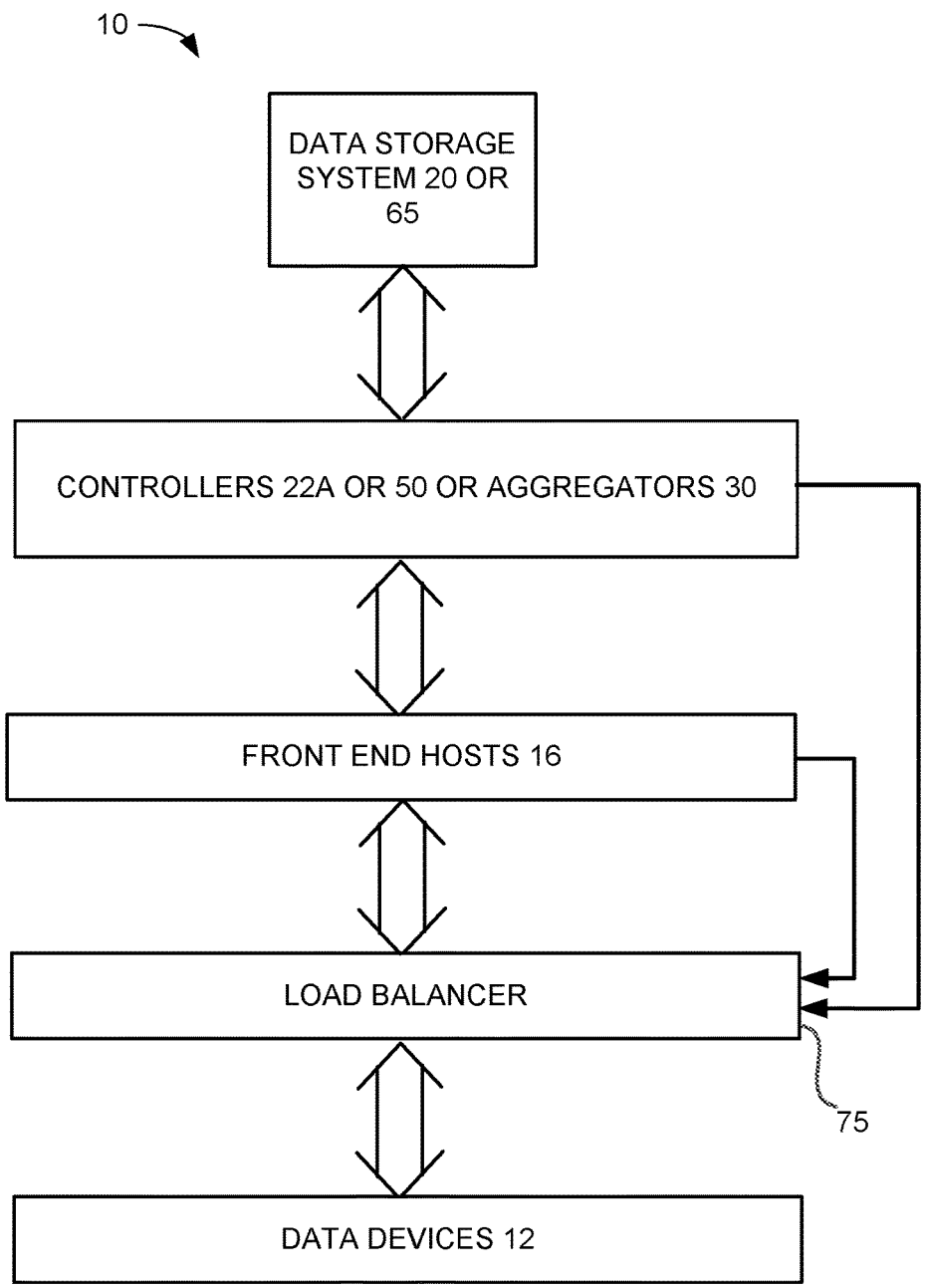
FIG. 6 is an illustration of an exemplary DTR control system with a load balancer.

FIG. 6 is an illustration of an exemplary DTR control system 10 with a load balancer 75. If the assignment of devices 12 to FEHs 16 is fixed, then there is the risk that one FEH 16 having several high-data usage devices 12 assigned to it might not be able to accommodate the data demands while other FEH 16 can have low-data usage devices assigned to them and have unused capacity. The use of load balancer 75 avoids this situation.

The FEHs 16, a controller 22A or 50, or aggregators 30 send DTR information for each FEH 16 and devices 12 to the load balancer 75. The load balancer 75 uses this DTR information to direct traffic between devices 12 and FEHs 16 so as to balance the load. For example, the devices 12A-12D assigned to FEH 16A might have been low DTR usage devices at the time of a previous assignment, and devices 12E-12J assigned to FEHs 16E-16J might have been high DTR usage devices at the time of that assignment, but that DTR usage has now reversed, in whole or in part. That is, devices 12A-12D are now high DTR usage devices so FEH 16A is overloaded, whereas the devices 12E-12J are now low DTR usage devices so FEHs 16E-16J are now underutilized.

The load balancer 75 would redirect one or more of the devices 12A-12D from FEH 16A to one or more of FEHs 16E-16J, and may also redirect one or more of the devices 12E-12J from FEHs 16E-16J to FEH 12A. For example, device 12B might be reassigned to FEH 16E, devices 12C and 12D might be reassigned to FEH 16F, and possibly some currently low DTR devices 12 might be reassigned to FEH 16A. Also, devices 12 can be reassigned among the FEHs 16 if an FEH 16 goes offline, or needs to be taken offline, or is no longer needed to service the current DTR load. Preferably, the load balancer 75 averages the DTR loads of the devices 12 and/or the FEHs 16 over a period of time so that minor changes in the DTR of a device 12 or an FEH 16 do not cause frequent reassignment of devices 12.

Figure 7:
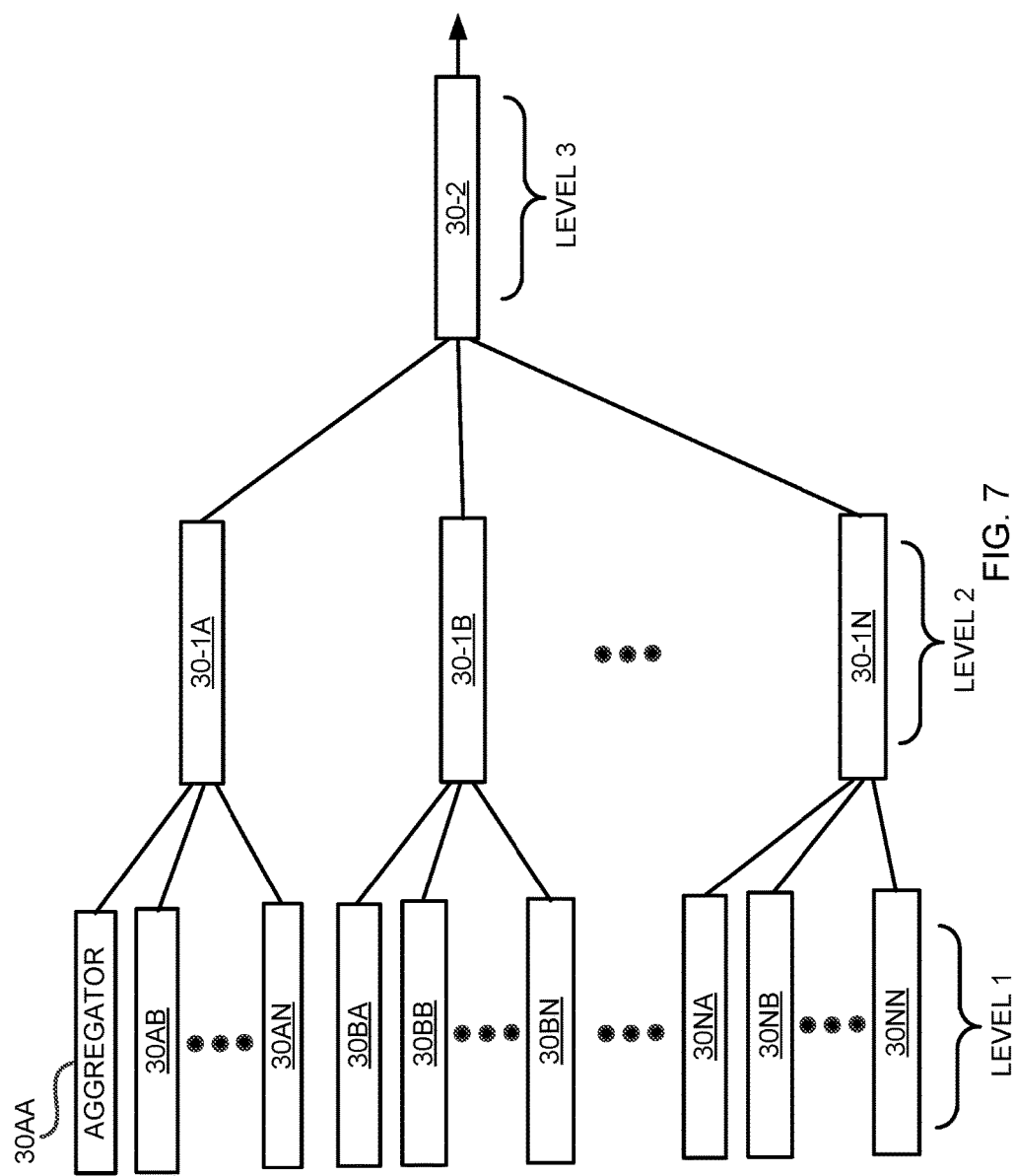
FIG. 7 is an illustration of multiple levels of aggregators.

FIG. 7 is an illustration of multiple levels of aggregators. FIGS. 2, 4, 5 and 6 illustrate only a single level of aggregators 30. This is merely for convenience of illustration. There may, if desired, be multiple levels of aggregators 30, such as where there are so many FEH 16 that only having a single level of aggregators 30 might increase delay time in reporting and/or otherwise adversely affect the performance of the system 10. FIG. 7 shows, for example, three levels of aggregators 30. Level 1 has aggregators 30AA-30AN, which collect data from a first set of FEH 16; aggregators 30BA- 30BN, which collect data from a second set of FEH 16; and aggregators 30NA-30NN which collect data from an Nth set of FEH 16. Each of these aggregators 30AA-30NN aggregate the data from their respective FEH 16 and send aggregated data to the next level of aggregators, level 2. Each aggregator 30AA-30NN may aggregate data by customer identification, by the FEH 16, by a type of device 12, by the amount of data sent by a device 12, or by other desired type of aggregation. Level 2 has aggregators 30-1A through 30-1N. Aggregator 30-1A collects data from aggregators 30AA-30AN; aggregator 30-1B collects data from aggregators 30BA-30BN; and aggregator 30-1N collects data from aggregators 30NA-30NN. Each of these aggregators 30-1A through 30-1N aggregate the data from their respective level 1 aggregators 30NA-30NN and send aggregated data to the next level of aggregators, level 3. Each aggregator 30-1A through 30-1N may aggregate data by customer identification, by the aggregators 30$x$A-30$x$N to which it is connected, by the FEH 16, by a type of device 12, by the amount of data sent by a device 12, or by other desired type of aggregation. Level 3 has aggregator 30-2, which collects data from aggregators 30-1A through 30-1N. Aggregator 30-2 aggregates the data from level 2 aggregators 30-1A through 30-1N. Aggregator 30-2 may aggregate data by customer identification, by the aggregators 30-1A through 30-1N to which it is connected, by the aggregators in level 1, by the FEH 16, by a type of device 12, by the amount of data sent by a device 12, or by other desired type of aggregation. Aggregator 30-2 may send the aggregated to a controller 22A or 50, to a higher level of aggregators, and/or to a data storage system 20, 65. Although only three levels of aggregation are shown, that is for convenience, and there may be many more levels. There may be as many levels of aggregators 30, and as many aggregators 30 within a level, as necessary or desired to achieve a desired aggregation of data and/or to accommodate the number of devices 12 being serviced. Use of multiple levels of aggregators 30 provides for accommodation of millions and even billions of devices 12.

Figure 8:
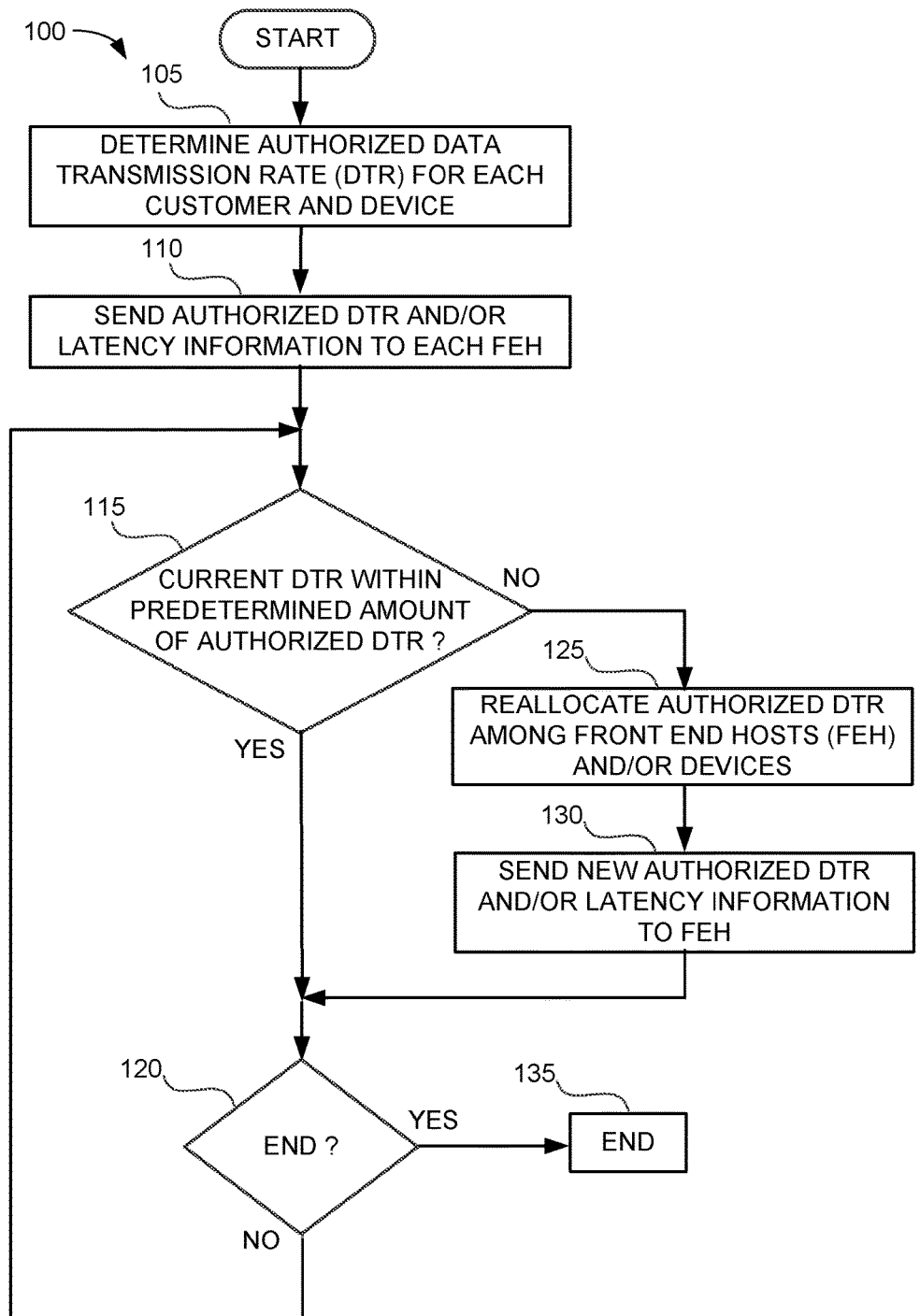
FIG. 8 is a flowchart showing an exemplary method of operation of a DTR control system.

FIG. 8 is a flowchart showing an exemplary method of operation 100 of a DTR control system. It should be appreciated that the logical operations described herein with respect to FIG. 8, and the other figures, can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations can be performed than shown in the figures and described herein. These operations can also be performed in parallel, or in a different order than those described herein. In particular, the operations shown therein can be performed by a single component or a group of components, such as by a controller 22A, controllers 50, an aggregator 30, or a sub-aggregator 35. Some or all of the operations can also be performed by a processor in a different component if desired.

Upon starting, the operation 105 determines the authorized DTR for each customer and, if the customer has specified it, an initial authorized DTR, a minimum authorized DTR, and/or a maximum authorized DTR for each device 12. In operation 110 the authorized DTR for an FEH 16, and/or the authorized DTRs for its device 12 and/or latency information for its device 12 is sent to the FEH 16. A customer might want a device 12 to always have a minimum DTR, and so can specify that as a lower limit on the DTR which can be assigned by a controller to that device 12. Also, a customer might not want a device 12 to send data a more than a specified maximum DTR. The controllers and aggregators have access to this information via the various databases and use these customer-specified DTRs in determining the DTRs which are to be assigned to its devices 12.

Also, in addition to, or instead of, specifying a minimum or maximum DTR for a device, the customer can specify the relative device priorities, so that a higher priority device of a customer will have a higher DTR than a lower priority device of that customer. The controllers and aggregators also have access to this information via the various databases and use these customer-specified priorities in determining the DTRs which are to be assigned to its devices 12.

Operation 115 determines whether the current DTR for a customer is within a predetermined amount of the authorized DTR for that customer and can also determine whether the current DTR for a device is within a predetermined amount of its authorized DTR. If so then operation 120 is performed. The predetermined amount can be a DTR number, such as 1 MB/s, or a percentage, such as 2%, and can be specified by the customer or can be specified by the service provider.

If not, then in operation 125 the authorized DTR is reallocated among the FEHs 16 and/or the devices 12 so that the customer receives the benefit of its authorized DTR. For example, if at one point device 12A had a lot of data to transmit, but other devices 12 for that customer did not, then that device 12A might have been awarded a higher authorized DTR and the other devices awarded a lower authorized DTR. Once the device 12A has completed its transmissions, and/or other devices 12 now have data to transmit, the authorized DTR for device 12A can be reduced and/or the authorized DTR of one or more of the other devices can be increased so that the total DTR of all of the customer's devices 12 is approximately the authorized DTR of the customer. The latency information can also be determined, based upon the assigned DTR, for the device 12.

In operation 130 this new authorized DTR and/or latency information is sent to the FEHs 16 for implementation. Operation 120 is then performed.

In operation 120 a determination is made whether the process is to be ended. Normally, the process 100 operates continuously but it can be ended, for example, to update the system hardware or software, perform maintenance operations, etc. To maintain continuity of service to customers, when one device 22A, 30, 35, 50 is ending operations then another device can begin those operations.

If the process is not to be ended at decision 120 then a return is made to operation 115 where the current DTR is checked and, if appropriate, the operation 125 reallocates the authorized DTR again.

Figure 9:
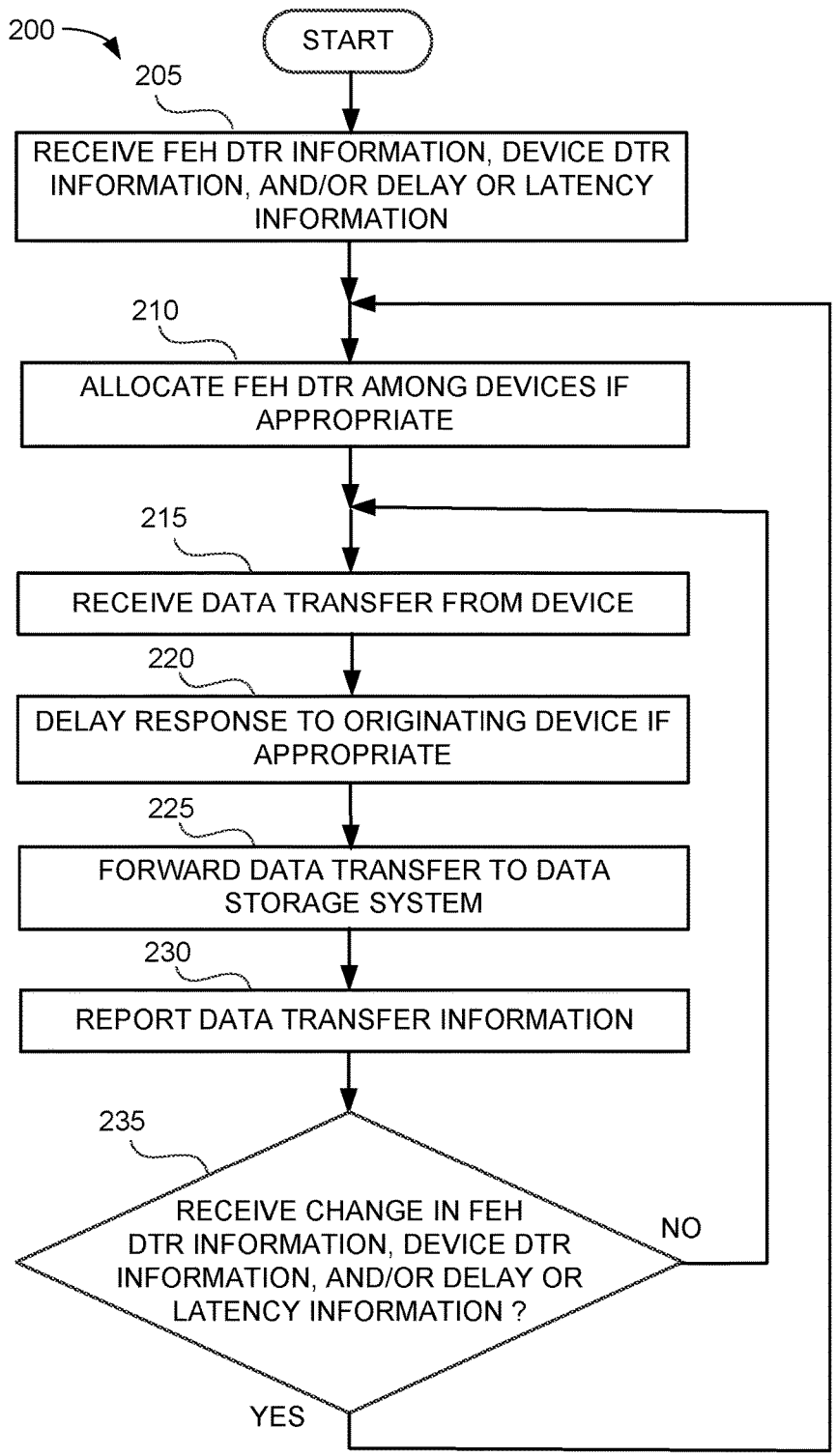
FIG. 9 is a flowchart showing an exemplary method of operation of a front end host.

FIG. 9 is a flowchart showing an exemplary method of operation 200 of a front end host 16. Upon starting an FEH 16 receives 205, from a controller 22A, 50 or an aggregator 30, 35, the DTR allocation for the FEH itself, DTR information for the devices 12 which are connected to it, and/or delay or latency information for each device 12. The FEH 16 allocates 210 its DTR among its devices 12, if appropriate. For example, the controller 22A, 50 or aggregator 30, 35 might have simply advised the FEH as to its assigned DTR, in which the FEH will allocate that DTR among its various devices and determine an appropriate buffer size and/or latency for each device. Or, the controller 22A, 50 or aggregator 30, 35 might have provided the FEH with detailed instructions as to the appropriate buffer size and/or latency for each device, in which case the FEH can simply implement those instructions. As mentioned, customer specifications regarding the minimum or maximum DTR for a device 12 are considered.

In operation 215 the FEH receives data from a device 12. In operation 220 the FEH delays responding (e.g., delays sending an acknowledgement of receipt of the data) to the originating device if appropriate to limit the device 12 to its assigned DTR. In operation 225 the FEH forwards the data to the intended destination, such as but not limited to the data storage system 20, 65. In operation 230 the FEH reports data transfer information to the controller 22A, 50 or aggregator 30, 35. That is, the FEH sends a message advising of the amount of the data transferred and an identification of the device.

In one configuration, an FEH 16 may report data transfer information at predetermined intervals. In another configuration, an FEH 16 may report data only when there has been a change in the data. E.g., device 12 is sending more (or less) data than previously reported. In yet another configuration, an FEH 16 may report data only when the change in the data exceeds a predetermined limit or a predetermined criteria. E.g., device 12A is sending 10% more data than previously reported, or a new device 12C has started sending data. Preferably, an FEH 16 only reports data when the change from previously reported data warrants the FEH 16 sending a new report. This serves to reduce traffic on the internal network 18.

In operation 235 the FEH determines whether it has received a change in the DTR allocation for the FEH itself, DTR information for the devices 12 which are connected to it, and/or delay or latency information for any device 12. This is because the controller 22A, 50 or aggregator 30, 35 might have changed those parameters in response to receiving the message from the FEH in operation 230. If not, then a return is made to operation 215 to receive the next data transfer from a device 12. If so, then a return is made to operation 210 to re-allocate the DTR for a device, assign a new latency or buffer size for that device, etc.

Figure 10:
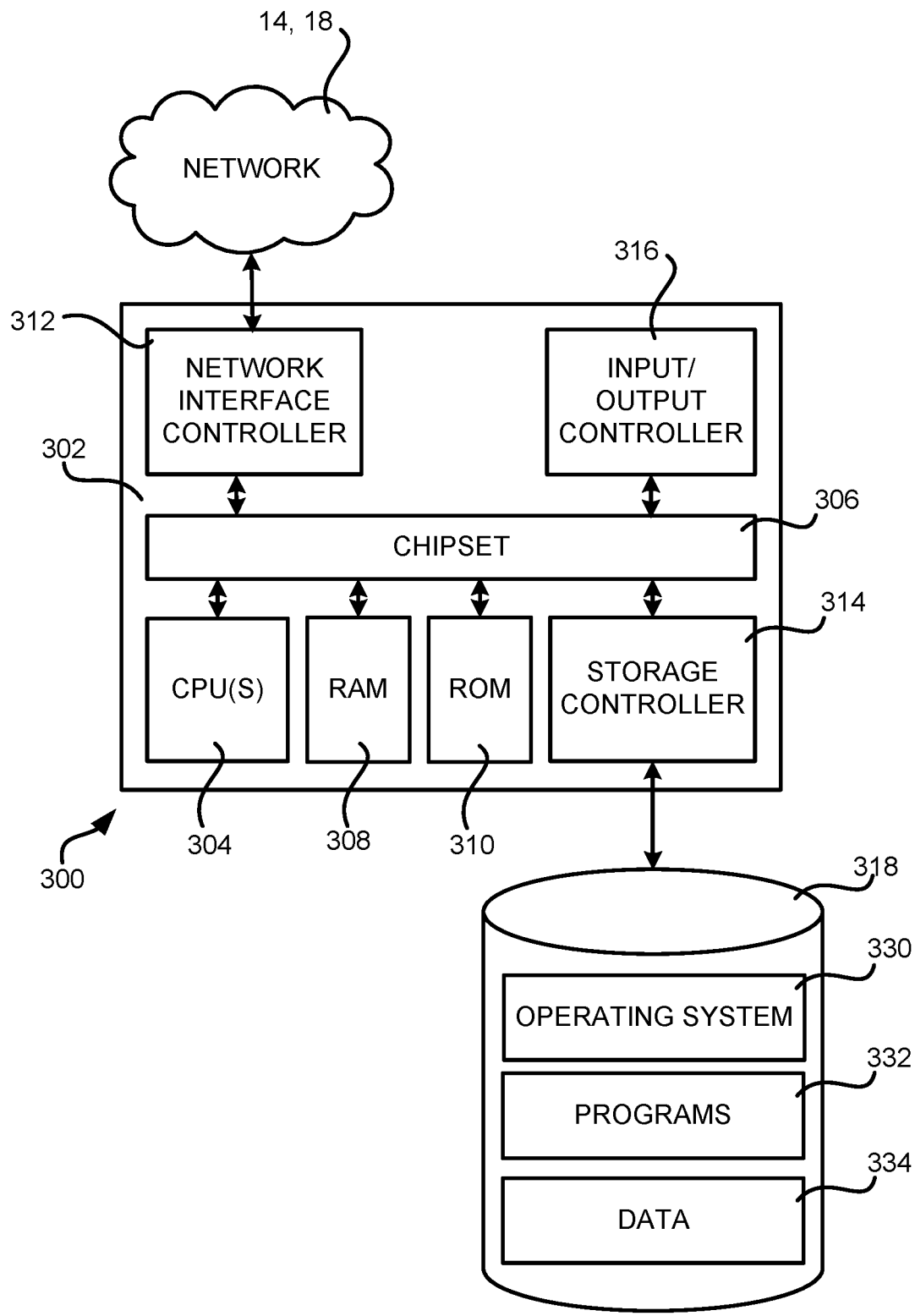
FIG. 10 is a computer architecture diagram showing exemplary computer architecture for a front end host, controller, aggregator, load balancer, data storage system, or other computing device capable of performing the functionality disclosed herein.

FIG. 10 is a computer architecture diagram showing exemplary computer architecture for a front end host, controller, aggregator, load balancer, data storage system, or other computing device capable of performing the functionality disclosed herein. The computer architecture shown illustrates a conventional server computer, workstation, desktop computer, laptop, network appliance, or other computing device, and can be utilized to execute any aspects of the software components presented herein described as executing within the computing device and/or other computing devices mentioned herein.

The computer 300 includes a baseboard, or "motherboard," which is a printed circuit board to which a multitude of components or devices can be connected by way of a system bus or other electrical communication paths. In one illustrative configuration, one or more central processing units ("CPUs") 302 operate in conjunction with a chipset 304. The CPUs 302 are standard programmable processors that perform arithmetic and logical operations necessary for the operation of the computer 300.

The CPUs 302 perform the necessary operations by transitioning from one discrete, physical state to the next through the manipulation of switching elements that differentiate between and change these states. Switching elements can include electronic circuits that maintain one of two binary states, such as flip-flops and electronic circuits that provide an output state based on the logical combination of the states of one or more other switching elements, such as logic gates. These basic switching elements can be combined to create more complex logic circuits, including registers, adders-subtractors, arithmetic logic units, floating-point units and the like.

The chipset 304 provides an interface between the CPUs 302 and the remainder of the components and devices on the baseboard. The chipset 304 can provide an interface to a random access memory ("RAM") 306, used as the main memory in the computer 300. The chipset 304 can further provide an interface to a computer-readable storage medium such as a read-only memory ("ROM") 308 or non-volatile RAM ("NVRAM") for storing basic routines that that help to startup the computer 300 and to transfer information between the various components and devices. The ROM 308 or NVRAM can also store other software components necessary for the operation of the computer 300 in accordance with the configurations described herein.

The computer 300 can operate in a networked environment using logical connections to remote computing devices and computer systems through a network such as network 14, 18, 40, 55, 60. The chipset 304 can include functionality for providing network connectivity through a network interface controller ("NIC") 310, such as a gigabit Ethernet adapter. The NIC 310 is capable of connecting the computer 300 to other computing devices over the network. It should be appreciated that multiple NICs 310 can be present in the computer 300, connecting the computer to multiple communication channels, such as but not limited to communication channels in the network, other types of networks, and remote computer systems.

The computer 300 can be connected to a mass storage device 318 that provides non-volatile storage for the computer. The mass storage device 318 can store system programs, application programs, other program modules and data, which have been described in greater detail herein. The mass storage device 318 can be connected to the computer 300 through a storage controller 314 connected to the chipset 304. The mass storage device 318 can consist of one or more physical storage units. The storage controller 314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 300 can store data on the mass storage device 318 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 318 is characterized as primary or secondary storage and the like.

For example, the computer 300 can store information to the mass storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 300 can further read information from the mass storage device 318 by detecting the physical states or characteristics of one or more particular locations within the physical storage units.

In addition to the mass storage device 318 described above, the computer 300 can have access to other computer-readable storage medium to store and retrieve information, such as program modules, data structures, or other data. It should be appreciated by those skilled in the art that computer-readable storage media can be any available media that provides for the storage of non-transitory data and that can be accessed by the computer 300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. Notwithstanding the above, computer-readable storage media, as used herein, specifically excludes interpretations thereof which are prohibited by applicable statutory and case law. For example, computer-readable storage media specifically excludes signals per se.

The mass storage device 318 can store an operating system 330 utilized to control the operation of the computer 300. According to one configuration, the operating system includes a member of the LINUX family of operating systems. According to another configuration, the operating system includes a member of the WINDOWS® SERVER family of operating systems from MICROSOFT Corporation in Redmond, Wash. According to further configurations, the operating system can include a member of the UNIX family of operating systems. It should be appreciated that other operating systems can also be utilized. The mass storage device 318 can store other system or application programs, modules, and/or data utilized by the computer 300 such as a programs module 332 that contains instructions regarding sending, receiving, determining, allocating, and/or acting upon the identification of a device or a customer, the priority of a device, the minimum and maximum customer-specified DTRs of a device, the buffer size, and/or the latency or delay, the authorized DTR of a customer, etc.

The data section 332 can contain information such as, but not limited to, the identification of a device or a customer, the priority of a device, the minimum and maximum customer-specified DTRs of a device, the buffer size, and/or the latency or delay, the authorized DTR of a customer, etc.

In one configuration, the mass storage device 318 or other computer-readable storage media is encoded with computer-executable instructions that, when loaded into the computer 300, transform the computer from a general-purpose computing system into a special-purpose computer capable of implementing the configurations described herein. These computer-executable instructions transform the computer 300 by specifying how the CPUs 302 transition between states, as described above. According to one configuration, the computer 300 has access to computer-readable storage media storing computer-executable instructions which, when executed by the computer 300, perform aspects of one or more of the methods or procedures described herein.

The computer 300 can also include an input/output controller 316 for receiving and processing input from a number of input devices, such as a keyboard, a mouse, a touchpad, a touch screen, an electronic stylus, or other type of input device. Similarly, the input/output controller 316 can provide output to a display, such as a computer monitor, a flat-panel display, a digital projector, a printer, a plotter, or other type of output device. It will be appreciated that the computer 300 might not include all of the components shown herein, can include other components that are not explicitly shown herein, or can utilize an architecture completely different than that shown herein.

The values mentioned herein for data transmission speed, DTR, packet size, and buffer size are exemplary to illustrate the concepts herein and are not limiting. Other data transmission speeds, transmission capacities, packet sizes, and buffer sizes can be used as desired or required for a particular implementation.

The phrases "for example" and "such as" mean "by way of example and not of limitation." The subject matter described herein is provided by way of illustration for the purposes of teaching, suggesting, and describing, and not limiting or restricting. Combinations and alternatives to the illustrated configurations are contemplated, described herein, and set forth in the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the exemplary configurations and applications illustrated and described, and without departing from the spirit and scope of the following claims.

What is claimed is:

1. A computer-implemented method of controlling the data transmission rate (DTR) of a plurality of data devices of a customer, the method comprising:
   determining current DTRs of the plurality of data devices of the customer;
   generating a sum of the current DTRs of the plurality of data devices;
   determining an authorized collective DTR for the plurality of data devices;
   determining that the sum of the current DTRs for the plurality of data devices is not within a specified amount of the authorized collective DTR for the plurality of data devices, the specified amount being non-zero; and
   in response to determining that the sum of the current DTRs is not within the specified amount of the authorized collective DTR, reallocating the authorized collective DTR among the plurality of data devices by, for at least one data device:
      if the sum of the current DTRs is greater than the authorized collective DTR then reducing an authorized DTR of the at least one data device to provide a reduced DTR for the at least one data device; or
      if the sum of the current DTRs is less than the authorized collective DTR then increasing an authorized DTR of the at least one data device to provide an increased DTR for the at least one data device.

2. The computer-implemented method of claim 1, wherein the sum of the current DTRs is greater than the authorized collective DTR, the authorized DTR of the at least one data device is reduced to provide a reduced DTR for the at least one data device, and further comprising:
   delaying acknowledgement of receipt of data from the at least one data device.

3. The computer-implemented method of claim 1, wherein:
   the sum of the current DTRs is greater than the authorized collective DTR, the authorized DTR of the at least one data device is reduced to provide a reduced DTR for the at least one data device, and there is a specified minimum DTR for the at least one data device; and
   wherein the reducing of the authorized DTR of the at least one data device does not reduce the authorized DTR of the at least one data device below the specified minimum DTR for the at least one data device.

4. The computer-implemented method of claim 1, wherein:
   there is a specified maximum DTR for the at least one data device; and
   the sum of the current DTRs is less than the authorized collective DTR and the authorized DTR of the at least one data device is increased to provide an increased DTR for the at least one data device; and
   wherein the increasing of the authorized DTR of the at least one data device does not increase the authorized DTR of the at least one data device above the specified maximum DTR specified for the at least one data device.

5. The computer-implemented method of claim 1, wherein the sum of the current DTRs is greater than the authorized collective DTR and the authorized DTR of the at least one data device is reduced to provide a reduced DTR for the at least one data device, and further comprising:
   reducing a delay in acknowledgement of receipt of data from the at least one data device.

6. The computer-implemented method of claim 1, wherein:
   a first data device of the plurality of data devices is connected to a first host;
   a second data device of the plurality of data devices is connected to a second host;
   the first host reports a current DTR of the first data device;
   the second host reports a current DTR of the second data device; and further comprising:
   determining that a sum of the current DTR for the first data device and the current DTR for second data device exceeds the authorized collective DTR; and
   sending an instruction to the first host to reduce an authorized DTR of the first data device.

7. The computer-implemented method of claim 1:
wherein:
   a first data device of the plurality of data devices is connected to a first host;
   a second data device of the plurality of data devices is connected to the first host; and
further comprising:
   the first host reports a current DTR of the first data device and a current DTR of second data device; and
   if a sum of the current DTR of the first data device and the current DTR of the second data device exceeds a predetermined DTR for the first host, then reassigning one of the first data device or the second data device to a second host.

8. The computer-implemented method of claim 1, wherein a data transmission speed for the at least one data device is fixed.

9. The computer-implemented method of claim 1 and further comprising, in response to the reducing of the authorized DTR of the at least one data device, reducing a buffer size used to receive data from the at least one data device.

10. The computer-implemented method of claim 1 and further comprising, in response to the increasing of the authorized DTR of the at least one data device, increasing a buffer size used to receive data from the at least one data device.

11. The computer-implemented method of claim 1 wherein generating a sum of the current DTRs comprises:
   receiving, from a first device, a sum of the current DTRs of a first group of the plurality of data devices to provide a first aggregated DTR;
   receiving, from a second device, a sum of the current DTRs of a second group of the plurality of data devices to provide a second aggregated DTR;
   summing the first aggregated DTR and the second aggregated DTR to provide the sum of the current DTRs of the plurality of data devices; and
   if the sum of the current DTRs of the plurality of data devices exceeds the authorized collective DTR for the plurality of data devices, sending an instruction to the first device to reduce the DTR of at least one data device connected to the first device.

12. The computer-implemented method of claim 1 wherein generating a sum of the current DTRs comprises:
   receiving, from a first device, a sum of the current DTRs of a first group of the plurality of data devices to provide a first aggregated DTR;
   receiving, from a second device, a sum of the current DTRs of a second group of the plurality of data devices to provide a second aggregated DTR;
   summing the first aggregated DTR and the second aggregated DTR to provide the sum of the current DTRs of the plurality of data devices; and
   if the sum of the current DTRs of the plurality of data devices is less than a predetermined amount below the authorized collective DTR for the plurality of data devices, sending an instruction to the first device to increase the DTR of at least one data device connected to the first device.

13. The computer-implemented method of claim 1 and further comprising:
   receiving, from a first device, a sum of the current DTRs of a first group of the plurality of data devices to provide a first aggregated DTR, the at least one data device being part of the first group, the data devices of the first group being connected to and providing respective individual data device DTRs to the first device;
   wherein the first device has an assigned DTR;
   determining a new assigned DTR for the first device;
   wherein reducing an authorized DTR of at the least one data device comprises sending an instruction to the first device to reduce the DTR of the at least one connected data device, and
   sending the new assigned DTR to the first device.

14. The computer-implemented method of claim 1 and further comprising:
   receiving, from a first device, a sum of the current DTRs of a first group of the plurality of data devices to provide a first aggregated DTR, the at least one data device being part of the first group, the data devices of the first group being connected to and providing respective individual data device DTRs to the first device;

receiving, from a second device, a sum of the current DTRs of a second group of the plurality of data devices to provide a second aggregated DTR, the data devices of the second group being connected to and providing respective individual data device DTRs to the second device;

determining, based upon the sum of the current DTRs from the first device and the sum of the current DTRs from the second device, that the at least one data device should be reassigned to the second device; and sending an instruction to at least one of the first device or the second device to reassign the at least one data device to the second device.

15. A computer-implemented method of controlling the data transmission rate (DTR) of a plurality of data devices of a customer, the method comprising: receiving, from a first device, individual current DTRs of data devices in a first group of the plurality of data devices, the data devices of the first group being connected to and providing respective individual data device DTRs to the first device;

summing the individual current DTRs of data devices in the first group to provide a first collective DTR for the first group;

determining a first authorized collective DTR for the first group;

receiving, from a second device, individual current DTRs of data devices in a second group of the data devices, the data devices of the second group being connected to and providing respective individual data device DTRs to the second device;

summing the individual current DTRs of data devices in the second group to provide a second collective DTR for the second group;

determining a second authorized collective DTR for the second group;

determining that first collective DTR exceeds the first authorized collective DTR;

determining, based upon the first collective DTR exceeding the first authorized collective DTR and the second collective DTR being less than the second authorized collective DTR, that the at least one data device should be reassigned to the second device; and sending an instruction to at least one of the first device or the second device to reassign the at least one data device to the second device.

16. The method of claim 1 wherein the specified amount is specified by either the customer or a service provider.

* * * * *